United States Patent [19]

Boundy et al.

[11] Patent Number: 5,260,387
[45] Date of Patent: Nov. 9, 1993

[54] COPOLYESTER ELASTOMER BLENDS

[75] Inventors: Mark Boundy; Don Clayton, both of Phoenix; Dinesh Shah, Chandler, all of Ariz.

[73] Assignee: W. L. Gore & Associates, Inc., Newark, Del.

[21] Appl. No.: 820,436

[22] Filed: Jan. 9, 1992

[51] Int. Cl.$^5$ ............................... C08F 20/00
[52] U.S. Cl. .................... 525/444; 525/437
[58] Field of Search .................. 525/444, 437

[56] References Cited

U.S. PATENT DOCUMENTS

| | | | |
|---|---|---|---|
| 3,784,520 | 1/1974 | Hoeschele | 260/75 R |
| 3,917,743 | 11/1975 | Schroeder et al. | 525/418 |
| 3,963,800 | 6/1976 | Gipp et al. | 260/860 |
| 4,136,715 | 1/1979 | McCormack et al. | 138/130 |
| 4,259,478 | 3/1981 | Jackson, Jr. et al. | 525/444 |
| 4,362,775 | 12/1982 | Yabe et al. | 428/213 |
| 4,643,925 | 2/1987 | Smith et al. | 428/213 |
| 4,970,275 | 11/1990 | Still et al. | 525/437 |
| 5,057,561 | 10/1991 | Manica et al. | 524/68 |

FOREIGN PATENT DOCUMENTS

| | | |
|---|---|---|
| 220711 | 10/1986 | European Pat. Off. . |
| 2263281 | 3/1975 | France . |
| 2287326 | 9/1975 | France . |
| 8704447 | 7/1987 | World Int. Prop. O. .......... 525/444 |

OTHER PUBLICATIONS

DuPont Company Hytrel* polyester elastomer brochures: Hytrel 5556; Hytrel G-40CB; Hytrel 7246; Hytrel MTR-8068; Hytrel G-30HS; Hytrel 5526 and 5556.

*Primary Examiner*—John Kight, III
*Assistant Examiner*—T. Mosley
*Attorney, Agent, or Firm*—Gary A. Samuels

[57] ABSTRACT

When an antioxidant, such as a selected secondary aromatic amine additive, is employed with a blend of thermoplastic polyester elastomers, the extrusion range window of at least one of the elastomers is altered to the extent that the blend can be uniformly melted and extruded.

5 Claims, No Drawings

COPOLYESTER ELASTOMER BLENDS

FIELD OF THE INVENTION

This invention relates to melt processible blends of thermoplastic copolyester elastomers and melt processed products of the blends. More particularly, it relates to such blends as contain a melt processing aid.

BACKGROUND OF THE INVENTION

A number of thermoplastic copolyester elastomers have been developed and are available commercially for specific end uses. For example, one such thermoplastic elastomer may contain flame retardants. Another such elastomer may contain segmented copolymer units which impart hardness to the elastomer. Because each copolyester elastomer may contain differing recurring block units, the range of their optimum extrusion temperatures may be very different, and in many instances, will not overlap. Thus, if two such copolyester elastomers are attempted to be melt processed together, such as by extrusion or injection molding, one may be completely melted or damaged from overheating and the other either not melted or only partially melted, resulting in lumps or grains in the resulting material. Yet, because it is often desirable to blend two or more types of thermoplastic polyester elastomers to impart particular properties to the resulting melt processed material, it would be desirable to find a way to melt process such blends to obtain a uniformly melted product.

SUMMARY OF THE INVENTION

It has now been found that when a selected additive is employed with incompatible blends of thermoplastic polyester elastomers described above, i.e., ones that have incompatible or non-overlapping extrusion temperature windows, the processing range window of at least one of the elastomers is altered to the extent that the blend can be uniformly melted and processed.

More specifically, this invention is directed to a molding composition comprising a blend of thermoplastic polyester elastomers, i.e., a blend of two or more polyester thermoplastic elastomers where the melting points of the two major components of the blend are far enough apart that at the usual melt processing temperature of the elastomer having the higher melting point, the other elastomer begins to degrade, which composition also contains a compatibilizing composition containing an antioxidant, such as a secondary aromatic amine, in an amount sufficient to result in a homogenous blend on melt processing.

The invention is also directed to a process for molding the molding composition, and to molded products such an electrical cable where the molded composition comprises the cable jacket.

DETAILED DESCRIPTION OF THE INVENTION

In one narrower aspect, the invention involves a blend of at least two such elastomers which have crystalline melting points at least 25° C. apart, in which a compatibilizing agent is present which acts to permit smooth melt processing of the two elastomers at one common temperature. The two elastomers comprise a major portion of the blend, i.e., over 50% by weight.

The compatibilizer is a polyester thermoplastic elastomer composition containing an antioxidant, such as a secondary aromatic amine. The compatibilizer of choice is "Hytrel G-30HS" available from the DuPont Company. The secondary aromatic amine in this formulation is apparently carried by a soft polyester thermoplastic elastomer, and apparently has some amide polymer contained in it. The amount of the compatibilizer present in the blends should be at least 1 percent by weight, and should range between 1 and 10 percent, preferably 2-5 percent.

The blends can contain other additives, e.g. colorants, such as carbon black, pigments, stabilizers and the like.

The thermoplastic polyester elastomers are available from several sources. The ones used in the Examples were obtained from the DuPont Company under the trademark "Hytrel" thermoplastic polyester elastomers. In general thermoplastic polyester elastomers are prepared from terephthalic acids or esters, a polyalkylene ether glycol, such as poly(tetramethylene ether) glycol and lower alkyl diols, such as 1,4-butanediol. In general the elastomer chain has two types of recurring units, one type composed of the terephthalic acid and the glycol and the other of the terephthalic acid and the diol.

By being able to blend and extrude or injection mold various polyester elastomers, a blend of desired properties can be obtained in the extrudate.

In cable jacketing applications where the jacket must be both hard and flame retardant, the preferred blend of thermoplastic copolyester elastomers will be between 2-35 percent by weight of a hard elastomer having a durometer D hardness of at least 55, and between 65-98 percent by weight of a mixture of a softer elastomer having a durometer D hardness of less than 50 that contains a flame-retardant. The softer polymer component also contains the compatibilizer which is premixed with the softer polymer in amounts of 1-10 percent by weight of the compatibilizer and 99-90 percent of the softer elastomer to make a total of 100 percent. This premixing can be carried out by melt processing, preferably by melt extrusion. In one preferred embodiment, the major elastomer in the blend will be a hard thermoplastic polyester elastomer having a durometer D hardness of at least 60 and the other will be a softer thermoplastic copolyester elastomer having a durometer hardness of less than 50. In a more preferred embodiment, the hard elastomer is Hytrel ® 7246 having a durometer hardness of 70D and the soft elastomer is Hytrel HTR 8088 having a nominal durometer hardness of 46D. In these embodiments, the blend is useful as a protective coating or jacketing around electrical cables or wires, as for example, round cable, ribbon cable or the like.

Once the premix is prepared, it is dry-blended with the other elastomer or elastomers by a suitable method, e.g., drum rolling, or the like. The resulting blend can then be melt processed by extrusion or injection molding.

The following examples illustrate the invention.

Melting points can be determined by Differential Scanning Calormeter at the endotherm peaks.

Durometer D hardness can be measured as described in ASTM-2240-85 using a Pacific Transducer Corp. Model H 3061.

EXAMPLES

Example 1

9.4 pounds (4.2 kg) of a soft thermoplastic polyester elastomer (Hytrel ® HTR 8068 which has a melting point of 169° C. and nominal Durometer D hardness of 46D and which contains a flame-retardant was mixed by hand with 0.6 pounds (0.27 kg) of a compatibilizing composition containing an antioxidant (Hytrel G30HS) and then pelletized together through a one inch (2.54 cm) extruder.

8.5 pounds (3.85 kg) of the mixture was then mixed by hand with 1.2 pounds (0.54 kg) of a hard thermoplastic polyester elastomer (Hytrel 5556 which has a melting point of 201° C. and a Durometer D hardness of 55) which had been premixed by hand with 0.3 pounds (0.13 kg) of a thermoplastic polyester elastomer containing carbon black (Hytrel 40CB).

The mixture so obtained was then extruded on a 1 ½ inch (3.81 cm) Entwistle extruder onto an electrical cable. The extrudate was uniform in appearance and had good abrasion resistance.

Example 2

In this example, soft Hytrel HTR 8068 containing fire retardant and Hytrel stabilizer G-30HS were pelletized in the amounts shown in Table 1 on a 1 inch (2.5 cm) Killian extruder. Then hard Hytrel 7246 and Hytrel color concentrate were pelletized on the same extruder in the amounts shown in Table 1. The two pelletized mixtures were then extruded on a 1 ½ inch (3.81 cm) Entwistle extruder onto a 1 inch (2.54 cm) wide electrical cable. Extrusion conditions are provided in Table 2. The cable was coated with polyurethane (Estane-5703) adhesive prior to extrusion.

TABLE 1

| | |
|---|---|
| SOFT HYTREL 8086 (pounds) | 6.9120 |
| HEAT STABILIZER HYTREL 30HS (pounds) | 0.2880 |
| HARD HYTREL 7246 (pounds) | 0.6590 |
| COLOR CONCENTRATE 40CB (pounds) | 0.1410 |
| HARD HYTREL/COLOR CONCENTRATE % | 9.1 |

TABLE 2

| | |
|---|---|
| ZONE-1 | 207° C. |
| ZONE-2 | 211° C. |
| ZONE-3 | 218° C. |
| ZONE-4 | 222° C. |
| ZONE-5 | 226° C. |
| ZONE-6 | 227° C. |
| ZONE-7 | 230° C. |
| SCREW SPEED RPM | 30 |

Abrasion resistance, flame retardancy and static dissipation were all good values, and the extruded polyester elastomer blends were all uniform in appearance with no discernable lumps.

We claim:

1. A melt processible composition comprising a blend of polyester thermoplastic elastomers prepared from terephthalic acid or esters, a polyalkylene ether glycol and a lower alkyl diol, in which at least two of the elastomers comprise a major portion of the blend and have crystalline melting points such that at melt processing temperatures of the elastomer having the higher melting point, the other elastomer begins to degrade, said composition also containing a compatibilizer composition having a secondary aromatic amine antioxidant present in an amount sufficient to provide a substantially homogenous extrudate on melt processing.

2. A melt processible composition of claim 1 wherein the crystalline melting point of the two polyester elastomers is at least 25° C. apart.

3. A melt processible composition of claim 1 or 2 wherein the composition contains predominately 2-35 percent by weight of a thermoplastic polyester elastomer having a Durometer D hardness of at least 55 and 98-65 percent by weight of a thermoplastic polyester elastomer having a Durometer D hardness of less than 50.

4. The composition of claim 3 wherein the compatibilizing composition is comprised of a thermoplastic polyester elastomer containing a secondary aromatic amine antioxidant.

5. In a process for melt processing a blend of at least two polyester thermoplastic elastomers wherein one of the elastomers begins to degrade at processing temperature, the improvement which consists essentially of conducting the processing in the presence of a secondary aromatic amine antioxidant.

* * * * *